Oct. 30, 1951  A. E. CHURCH  2,573,403
FLUID OPERATED CHUCK
Filed Aug. 2, 1948
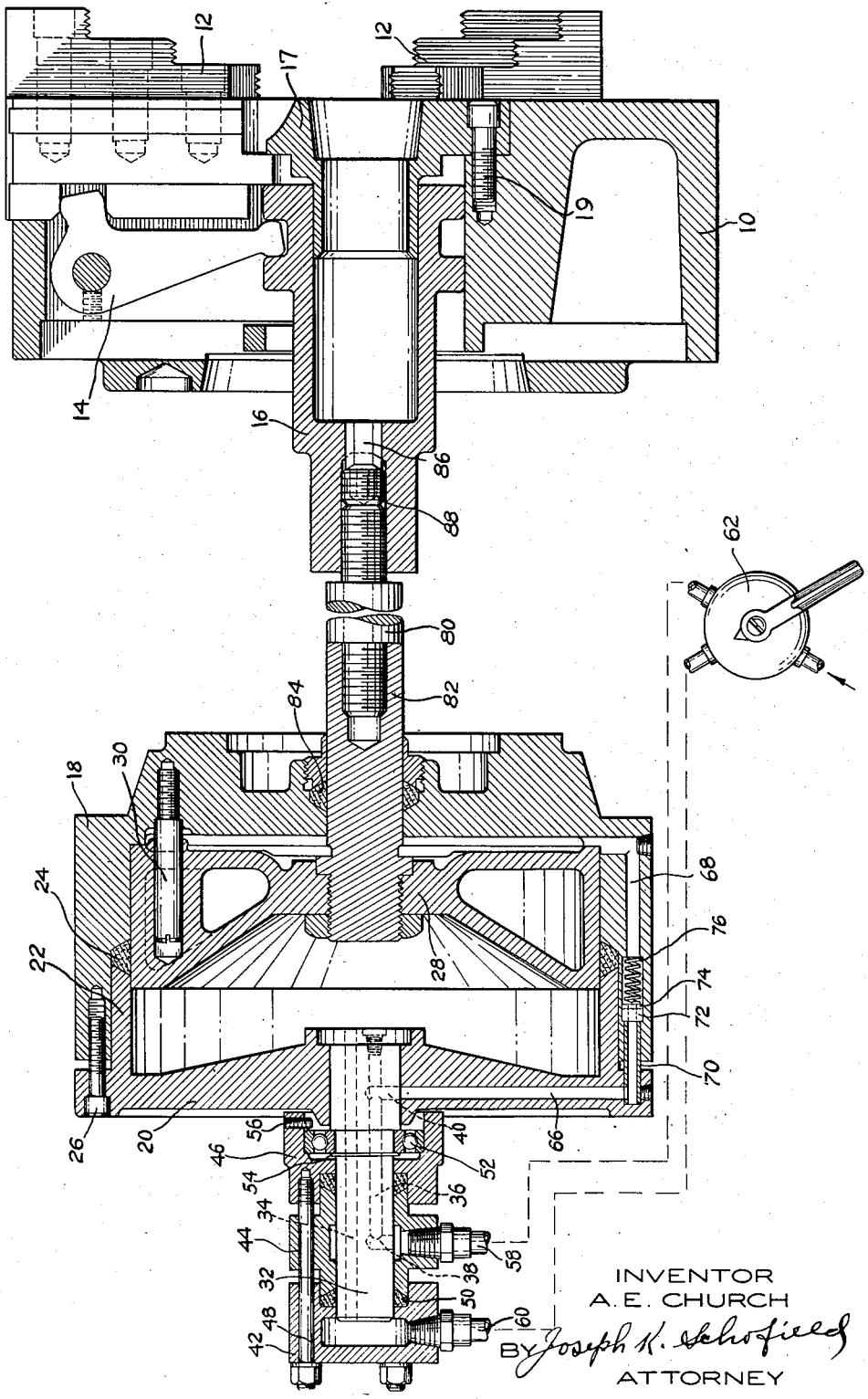
INVENTOR
A. E. CHURCH
BY Joseph K. Schofield
ATTORNEY Patented Oct. 30, 1951

2,573,403

UNITED STATES PATENT OFFICE 2,573,403

FLUID OPERATED CHUCK

Albert E. Church, New Britain, Conn., assignor to Union Manufacturing Company, New Britain, Conn., a corporation of Connecticut Application August 2, 1948, Serial No. 41,908

5 Claims. (Cl. 279—4)

1

This invention relates to rotatable work holding chucks and particularly to fluid pressure operated chucks of this type having an operating piston within a cylinder and connected to the jaw actuating levers by means of an adjustable bar or rod extending within the spindle on which the chuck and cylinder are mounted.

An object of the invention is to provide a novel fluid pressure supply means for admitting fluid under pressure to the opposite ends of the cylinder within which the jaw operating piston operates.

Another object of the invention is to provide improved and simplified means for adjusting the length of the bar connecting the actuating piston within its cylinder to the jaw operating levers of the chuck so that the stroke of the jaw members and the limits of their movements may be conveniently varied.

With the above and other objects in view the invention may include the features of construction and operation set forth in the following specification and illustrated in the accompanying drawing.

In the accompanying drawing annexed hereto and forming a part of this specification, I have shown the invention embodied in a fluid operated chuck for application to the headstock spindle of an engine lathe but it will be understood that the drawing is not to be construed as defining or limiting the scope of the invention, the claims appended to this specification being relied upon for that purpose.

In the drawing the figure is a central longitudinal section showing the rotating parts of a fluid operated work holding chuck adapted for application to an engine lathe and made according to the present invention.

Briefly and in its preferred aspect, the invention may include the following principal parts: First, a chuck adapted for mounting on one end of a lathe spindle (not shown); second, jaw operating levers individually connected to the radially movable jaws; third, an axially movable member centrally disposed within the chuck and operatively engaging the inner ends of said levers; fourth, an elongated rod connected adjustably to said axially movable member at one end; fifth, a piston mounted on the opposite end of said rod; sixth, a cylinder within which said piston operates mounted on the opposite end of the spindle mounting the chuck; and seventh, means to supply fluid under pressure to said cylinder on opposite sides of said piston.

Referring more in detail to the figures of the drawing there is provided a chuck body 10 having

2 jaws 12 radially movable within slots provided therefor. Connected to each of said jaws 12 is a lever 14, pivoted at an intermediate portion within the chuck body 10. The inner ends of the jaw levers 14 are connected to an axially movable member 16 centrally mounted within the chuck 10 so that movement of this centrally mounted member 16 will radially actuate the jaws 12. To support the central member 16 for slidable movement axially of the chuck 10 a sleeve member 17 may be provided as shown over which the forward end of member 16, the member 17 is fixed in position to the chuck 10 by means of suitable screws 19 but one of which is shown.

At the opposite end of the spindle mounting to chuck 10 is secured a cylinder 18 any conventional means being employed to mount the cylinder 18 in fixed position on the spindle (not shown) for rotation therewith. The cylinder 18 is bored for a portion of its length concentrically with its axis of rotation, and its open end is closed by a cover plate 20 having an annular portion 22 fitting within a counterbored portion of the cylinder. This cover plate 20 may be secured in pressure tight relation to the cylinder body 18 by an annular packing 24 compressed in position by the attaching bolts 26 for the cover plate 20. As shown, within the cylinder 18 is a piston 28 of sufficient axial length relative to the length of the cylinder 18 to overrun the packing 24 in all operative positions. To assure rotation of the piston 28 with its cylinder 18 and the chuck 10 during accelerating and decelerating of the spindle a pin 30 may be secured within the forward end wall of the cylinder 18. This pin 30 extends and is slidable within a suitable hole provided as shown within the the piston 28 and extending parallelly with the cylinder axis.

The fluid pressure supply for the cylinder 18 to actuate the piston 28 in either direction comprises the following means. The cover plate 20 for the cylinder 18 has secured thereto an axially extending cylindrical member 32 having a bore 34 therein from end to end and also having a bore 36 as shown extending from its inner end to connect two radial branch openings 38 and 40. The inner end of this latter bore 36 is plugged as shown. Surrounding this cylindrical member 32 is a three part member 42—44—46 connected, the parts being connected together for rotation relatively to the cylindrical member 32. The central member 44 and end members 42 and 46 are connected by through bolts 48 the tightening of which compresses suitable annular packings 50 disposed between the members as shown. The innermost of the three members 46 may have an anti-friction bearing 52 held in place on the cylindrical member 32 by a retaining ring 54 engaging its inner race and retained within the non-rotative member 46 by retaining screws 56 bearing against its outer race but one of which is shown. Fluid pressure supplies 58 and 60 are connected to the central member 44 and to the outermost member 42 respectively as by means of a three-way valve 62 and conduits permitting fluid admission and exhaust of fluid under pressure to and from either end of the cylinder 18. The fluid connection 58 to the central member 44 connects to the conduit 36 within the cylindrical member 32 and from the radial branch conduit 40 to a conduit 66 formed within the cover plate 20. This conduit 66 connects to a conduit 68 within the cylinder 18 leading to the forward end thereof. To close the joint between the conduits 66 and 68 in the cover plate and cylinder in pressure tight relation a tube 70 may be secured in pressure tight relation to the conduit 66 within the cover plate 20. This tube slidably extends within the conduit 68 within the cylinder 18 and against the end of this tube 70 fits an annular gasket 72 pressed in place by a metal ring 74 against which presses a light helical spring 76. By admitting fluid under pressure through intake connection 58 the piston 28 is forced to the left as seen in the figure to draw the jaws 12 radially inward. The tube 70 and its packing 72 as shown permit adjustment between the cover plate 20 and the cylinder 18 to take up the gasket 24 and maintain conduits 66 and 68 fluid tight at all times.

To move the piston 28 in the opposite direction to open the jaws 12 fluid is admitted through connection 60 to the outer end of the cylindrical member 32 from which it is admitted through this member directly to the outer end of the cylinder 18.

To control the admission of fluid to the opposite ends of the cylinder 18 the three-way valve 62 as shown may be employed connected to a suitable fluid supply and to the connections 58 and 60 so that when fluid is being admitted to one end of the cylinder 18 it is being discharged from the opposite end.

The central rod 80 connecting the member 16 and piston 28 is adjustable as to its length so that the movement of the jaws 12 and their levers 14 may be reduced when the full movement of the jaws effected by movement of the piston 28, from end to end of its cylinder, is not required. Furthermore, these adjustments of the rod 80 are so designed that they may be accomplished entirely from the chuck end of the rod. As shown in the figure the rod 80 has a member 82 preferably permanently threaded thereto which extends into the forward end of the cylinder 18 and is permanently attached at its opposite end to the piston 28. A packing 84 surrounding the member 82 provides a pressure tight sliding joint between rod member 82 and cylinder 18.

At the chuck end of the rod 80 it is reduced in diameter and threaded to the axially movable member 16. By rotation of this axially movable member 16 relative to the rod 80 the effective length of the rod may be varied. For this purpose a portion 86 of the longitudinal hole extending through the axially movable member 16 is non-circular in cross section for application of a wrench. To lock the rod 80 in any adjusted position relative to the axially movable member 16 a locking nut 88 is threaded into the threaded hole of the threaded end of the rod and may be adjusted to tightly engage against the inner end of the rod 80. To adjust this locking nut 88 it is recessed as shown for a socket wrench in the conventional manner. As will be seen from the figure of the drawing precision adjustments of the length of the rod 80 can be made from the chuck end of the spindle mounting the chuck 10 by wrenches applied first to the axially movable member 16 and then to the locking nut 88 centrally and axially through the chuck and the member 16.

Adjustment of the length of rod 80 varies the distance between the annular groove in member 16 for connection to the jaw levers 16 and the piston 28. This adjustment permits the position of the jaws to be varied with the piston in the position as shown in the drawing. The adjustment therefore enables the minimum stroke of the piston to be made use of to give the necessary jaw closing movement.

I claim as my invention:

1. A chuck adjusting device comprising a chuck having radially movable jaws, actuating means therefor including jaw levers and a central axially movable member connected to said jaws by said levers, a rod adjustably connected to said axially movable member, fluid pressure means acting on said rod to open and close said jaws, a threaded connection between said rod and axially movable member, a locking nut threaded within said axially movable member and bearing against the threaded end of said rod, means to rotate said axially movable member on the threaded end of said rod, and means to tighten said lock nut, said last two means being operated by a member extending through said chuck.

2. Fluid supplying means for a chuck comprising a cylinder mounted for rotation with the chuck, a cover plate closing one end of said cylinder, an annular extension on said cover plate extending within said cylinder, a pressure tight packing between the end surface of the annular portion of said cover plate and a surface of said cylinder, a piston slidable within said cylinder, the cylindrical surface of which overruns the packing in all positions of said piston, a rod connecting said piston to jaw operating members within said chuck, and means to admit fluid under pressure to the opposite ends of said cylinder through said cover plate.

3. Fluid supplying means for a chuck comprising a cylinder mounted for rotation with the chuck, a cover plate closing one end of said cylinder, an annular extension on said cover plate extending within said cylinder, a pressure tight packing between the end surface of the annular portion of said cover plate and a surface of said cylinder, a piston slidable within said cylinder, the cylindrical surface of which overruns the packing in all positions of said piston, a rod connecting said piston to jaw operating members within said chuck, and fluid supply means to admit fluid to the opposite ends of said cylinder, said fluid admitting means being connected to said cover plate for relative rotation therewith.

4. Fluid pressure operating means for a chuck comprising a cylinder, a cover plate secured thereto, a piston slidable within said cylinder, a member extending co-axially from and secured to said cover plate, a conduit within said co-axial member leading to one end of said cylinder, a second conduit within said coaxial member connecting with conduits within said cover plate and cylinder leading to the opposite end of said cylinder, a fluid supply member rotatably mounted relative to said co-axial member, and independent fluid supply connections on said supply member, whereby during rotation of said cylinder fluid may be admitted to either end of said cylinder.

5. Fluid pressure operating means for a chuck comprising a cylinder, a cover plate thereon forming a part of the internal cylindrical surface thereof, a piston slidable within said cylinder and cover plate, a member secured to and extending co-axially from said cover plate, a fluid supply conduit within said member leading to one end of said cylinder, a second conduit within said co-axial member connecting with conduits within said cover plate and cylinder leading to the opposite end of said cylinder, and a pressure tight connection between aligned portions of the conduits in said cylinder and cover plate, said connection including a tube secured in one conduit and extending slidably within the other, an annular packing at the free end of said tube, and resilient means to maintain said packing against the end of said tube.

ALBERT E. CHURCH.

REFERENCES CITED

The following references are of record in the file of this patent:

UNITED STATES PATENTS

| Number | Name | Date |
| --- | --- | --- |
| 1,139,419 | Hilton | May 11, 1915 |
| 1,670,138 | Cockburn | May 15, 1928 |
| 1,925,109 | Olson | Sept. 5, 1933 |
| 1,968,700 | Milotta | July 31, 1934 |
| 2,188,095 | Hartsuff | Jan. 23, 1940 |
| 2,418,082 | Marasko | Mar. 25, 1947 |